United States Patent
Sasaki et al.

(10) Patent No.: US 9,424,704 B2
(45) Date of Patent: Aug. 23, 2016

(54) INFORMATION PROCESSING DEVICE, CASH PROCESSING TERMINAL, AND INFORMATION PROCESSING SYSTEM

(71) Applicant: Oki Electric Industry Co., Ltd., Tokyo (JP)

(72) Inventors: Akihiro Sasaki, Tokyo (JP); Masaichi Koide, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 14/410,058

(22) PCT Filed: May 20, 2013

(86) PCT No.: PCT/JP2013/063987
§ 371 (c)(1),
(2) Date: Dec. 19, 2014

(87) PCT Pub. No.: WO2014/010308
PCT Pub. Date: Jan. 16, 2014

(65) Prior Publication Data
US 2015/0325073 A1 Nov. 12, 2015

(30) Foreign Application Priority Data
Jul. 10, 2012 (JP) ................................. 2012-154390

(51) Int. Cl.
| G07F 19/00 | (2006.01) |
| G07D 7/00 | (2016.01) |
| G07D 11/00 | (2006.01) |
| G06Q 20/18 | (2012.01) |
| G07D 9/00 | (2006.01) |
| G07D 13/00 | (2006.01) |

(52) U.S. Cl.
CPC .............. G07D 7/0006 (2013.01); G06Q 20/18 (2013.01); G07D 9/00 (2013.01); G07D 11/0066 (2013.01); G07D 13/00 (2013.01); G07F 19/00 (2013.01)

(58) Field of Classification Search
CPC ... G07F 19/20; G07F 7/1008; G06Q 20/1085; G06Q 30/02; G06Q 20/341
USPC .......................................... 235/379, 380, 375
See application file for complete search history.

(56) References Cited

U.S. PATENT DOCUMENTS

| 2003/0059098 A1* | 3/2003 | Jones ................... G06Q 20/042 382/135 |
| 2003/0132281 A1 | 7/2003 | Jones et al. |
| 2009/0026116 A1* | 1/2009 | Lubbers ................... B07C 5/34 209/534 |

FOREIGN PATENT DOCUMENTS

| JP | 2007-219817 A | 8/2007 |
| JP | 2010-049373 A | 3/2010 |
| JP | 2010-117803 A | 5/2010 |
| JP | 2011-159076 A | 8/2011 |
| JP | 2012-123696 A | 6/2012 |

OTHER PUBLICATIONS

Chinese Office Action with translation dated Apr. 5, 2016, 201380031627.7.

* cited by examiner

*Primary Examiner* — Karl D Frech
(74) *Attorney, Agent, or Firm* — Rabin & Berdo, P.C.

(57) ABSTRACT

Provided is an art by which serial numbers read by a cash processing terminal can be easily searched or analyzed, and the time and effort of recording the serial numbers of counterfeit banknotes in the cash processing terminal is reduced. An information processing device (100) set up between a cash processing terminal group in a local network and an external network that is external thereto is provided. The information processing device (100) comprises: an information acquisition unit (121) that acquires, in the local network, the serial numbers obtained by reading paper money using a cash processing terminal (200) that constitutes the cash processing terminal group; a storage control unit (122) that stores the serial numbers in a storage unit (130); a condition acquisition unit (124) that acquires a condition relating to the serial numbers of the counterfeit banknotes; and a serial number notification unit (125) that acquires, from the storage unit (130), the serial numbers meeting the condition and notifies any of the cash processing terminals constituting the cash processing terminal group, or a cash processing terminal in a local network different from the abovementioned local network.

10 Claims, 11 Drawing Sheets

HISTORY 1

| NO. | SERIAL NUMBER | TRANSACTION DATA ||||||||
|---|---|---|---|---|---|---|---|---|---|
| | | START || FINISH || TRANSACTION | TRANSACTION AGENT | STATUS | SEPARATED FROM | STACKING DESTINATION |
| | | YYYY/MM/DD | HH/MM/SS | YYYY/MM/DD | HH/MM/SS | | | | | |
| 1 | 1234567890 | 2012/1/10 | 13:30:20 | 2012/1/10 | 13:32:25 | WITHDRAWAL | GENERAL | NORMAL COMPLETION | CASSETTE A | PAY-IN/PAY-OUT PORT |
| 2 | 1111111111 | 2012/1/10 | 18:30:20 | 2012/1/10 | 18:40:20 | SEALING | BANK WORKER | NORMAL COMPLETION | TAKE-IN SECTION | NO. 5 STACKING |
| 3 | 1212121212 | 2012/1/10 | 18:45:20 | 2012/1/10 | 18:48:57 | DEPOSIT | BANK WORKER | NORMAL COMPLETION | PAY-IN/PAY-OUT PORT | CASSETTE B |
| ... | ... | ... | ... | ... | ... | ... | ... | ... | ... | ... |
| N | 9999999999 | 2011/1/10 | 18:42:29 | 2011/1/10 | 18:45:20 | DEPOSIT | BANK WORKER | NORMAL COMPLETION | PAY-IN/PAY-OUT PORT | CASSETTE B |

HISTORY 1

| RECOGNITION RESULTS |||||| DEVICE CATEGORY | DEVICE ID | CASSETTE ID | BAND NUMBER |
|---|---|---|---|---|---|---|---|---|---|
| SERIAL NO. READ RESULT | BILL TYPE DATA | VALUE | CATEGORY | YEAR DATA | | | | | |
| OK | CNY | 100 | C4B | 1999 | | ATM | 12345678 | - | - |
| OK | CNY | 50 | C4B | 2005 | | BANKNOTE SORTING MACHINE | 33333333 | - | 199 |
| OK | CNY | 100 | C4B | 2002 | | ATM | 13456789 | 1111111111111110 | - |
| ... | ... | ... | ... | ... | | ... | ... | ... | ... |
| OK | CNY | 100 | C4A | 2002 | | ATM | 13456789 | 1111111111111110 | - |

FIG.6

HISTORY 2

| START | | FINISH | | TRANSACTION DATA | | | | | |
|---|---|---|---|---|---|---|---|---|---|
| YYYY/MM/DD | HH/MM/SS | YYYY/MM/DD | HH/MM/SS | TRANSACTION | TRANSACTION AGENT | STATUS | SEPARATED FROM | STACKING DESTINATION | |
| 2012/1/10 | 9:30:20 | 2012/1/10 | 9:32:25 | DEPOSIT | GENERAL | NORMAL COMPLETION | PAY-IN/PAY-OUT PORT | CASSETTE A | |
| 2012/1/10 | 15:30:20 | 2012/1/10 | 15:40:20 | WITHDRAWAL | BANK WORKER | NORMAL COMPLETION | TAKE-IN SECTION | OP1 | |
| 2012/1/10 | 12:30:20 | 2012/1/10 | 18:48:57 | WITHDRAWAL | BANK WORKER | NORMAL COMPLETION | TAKE-IN SECTION | OP1 | |
| ... | ... | ... | ... | ... | ... | ... | ... | ... | |
| 2011/1/10 | 12:30:20 | 2011/1/10 | 18:45:20 | WITHDRAWAL | BANK WORKER | NORMAL COMPLETION | TAKE-IN SECTION | OP1 | |

HISTORY 2

| RECOGNITION RESULTS | | | | | | | | | |
|---|---|---|---|---|---|---|---|---|---|
| SERIAL NO. READ RESULT | BILL TYPE DATA | VALUE | CATEGORY | YEAR DATA | DEVICE CATEGORY | DEVICE ID | CASSETTE ID | BAND NUMBER |
| OK | CNY | 100 | C4B | 1999 | ATM | 12345678 | 1234567890123450 | - |
| OK | CNY | 50 | C4B | 2005 | BALANCE CHECK CASH RECYCLER | 98765432 | 1122334455667780 | - |
| OK | CNY | 50 | C4B | 2005 | BALANCE CHECK CASH RECYCLER | 98765432 | 1122334455667780 | - |
| ... | ... | ... | ... | ... | ... | ... | ... | ... |
| OK | CNY | 50 | C4A | 2005 | BALANCE CHECK CASH RECYCLER | 98765432 | 1122334455667780 | - |

FIG.7

HISTORY N (16 MAXIMUM)

TRANSACTION DATA

| START | | FINISH | | TRANSACTION | TRANSACTION AGENT | STATUS | SEPARATED FROM | STACKING DESTINATION |
|---|---|---|---|---|---|---|---|---|
| YYYY/MM/DD | HH/MM/SS | YYYY/MM/DD | HH/MM/SS | | | | | |
| 2012/1/10 | 10:30:20 | 2012/1/10 | 10:31:40 | DEPOSIT | GENERAL | NORMAL COMPLETION | PAY-IN/PAY-OUT PORT | CASSETTE B |
| ... | ... | ... | ... | ... | ... | ... | ... | ... |

HISTORY N (16 MAXIMUM)

RECOGNITION RESULTS

| SERIAL NO. READ RESULT | BILL TYPE DATA | VALUE | CATEGORY | YEAR DATA | DEVICE CATEGORY | DEVICE ID | CASSETTE ID | BAND NUMBER |
|---|---|---|---|---|---|---|---|---|
| OK | CNY | 50 | C4B | 2005 | TCR | 23456789 | 11223344555667780 | - |
| ... | ... | ... | ... | ... | ... | ... | ... | - |
| ... | ... | ... | ... | ... | ... | ... | ... | - |
| | | | | | | | | ... |

INFORMATION PROCESSING DEVICE, CASH PROCESSING TERMINAL, AND INFORMATION PROCESSING SYSTEM

TECHNICAL FIELD

The present invention relates to an information processing device, a cash processing terminal and an information processing system.

BACKGROUND ART

Generally cash processing terminals that handle banknotes are installed in financial institutions such as banks Examples of cash processing terminals include an Automatic Teller Machine (ATM), a Teller Cash Recycler (TCR), a balance check cash recycler, and a banknote sorting machine. These cash processing terminals are connected to a local network (refer, for example, to Japanese Patent Application Laid-Open (JP-A) No. 2010-049373). An ATM controller, a teller terminal, a balance check terminal, a banknote sorting terminal, and the like, corresponding to high-level terminals for the respective cash processing terminals, are also connected to the local network.

Sequential numbers (hereafter referred to as "serial numbers") are printed on banknotes for each type of banknote, and the cash processing terminals include functionality to read the serial numbers printed on banknotes. Serial numbers read by the ATM can be accumulated in the ATM controller. Similarly, serial numbers read by the teller cash recycler can be accumulated in the teller terminal, serial numbers read by the balance check cash recycler can be accumulated in the balance check terminal, and serial numbers read by the banknote sorting machine can be accumulated by the banknote sorting machine terminal.

DISCLOSURE OF INVENTION

Technical Problem

However, the serial numbers read by the cash processing terminals in such a system are only accumulated in the individual cash processing terminals, or the high-level terminals thereof (the ATM controller, the teller terminal, the balance check terminal, the banknote sorting terminal, or the like, in the example described above). The serial numbers read by the cash processing terminals are therefore not centrally managed, and search and analysis of the serial numbers cannot be easily performed.

Moreover, supposing a case in which serial numbers are managed centrally in such a system, the cash processing terminals would need to transmit the serial numbers to a financial administration system through a core network external to the local network, with the serial numbers centrally managed in the financial administration system. However, since the financial administration system is a location where data is strictly controlled by the bank, the financial administration system cannot be easily accessed to perform search and analysis of serial numbers, due to considerations of security and communication volumes.

A specific serial number can be registered in the cash processing terminals, using a maintenance menu or the like. In a case in which a counterfeit note is discovered in circulation, for example, the counterfeit note serial number (specifically, the entire serial number or some of the digits) can be registered in the cash processing terminals. After the cash processing terminals have registered the counterfeit note serial number, a cash processing terminal that detects a banknote printed with the serial number can forcibly reject the banknote, isolate the bank note in a designated holding box, or stop the transaction.

However, since an operator (such as a bank worker or maintenance staff) needs to manually input registration of the counterfeit note serial number into each cash processing terminal, the working time of the operator cannot be reduced, and errors when inputting the counterfeit note serial number are liable to occur.

In consideration of the above circumstances, an object of the present invention is to provide technology that enables search and analysis of serial numbers read by cash processing terminals to be easily performed, and that reduces the workload when registering a counterfeit note serial number in the cash processing terminals.

Solution to Problem

In order to address the above issue, an aspect of the present invention provides an information processing device provided between a cash processing terminal cluster in a local network and an external network outside the local network, the information processing device including: an information acquisition section that in the local network acquires serial numbers obtained from banknotes read by cash processing terminals configuring the cash processing terminal cluster; a storage controller that stores the serial numbers in a storage section; a condition acquisition section that acquires a counterfeit note serial number related condition; and a serial number notification section that acquires a serial number satisfying the condition from the storage section, and notifies the serial number to any of the cash processing terminals configuring the cash processing terminal cluster, or to a cash processing terminal in a local network different from the local network.

The serial number notification section may notify the serial number to a cash processing terminal selected from out of any of the cash processing terminals configuring the cash processing terminal cluster or a cash processing terminal in a local network that is different from the local network.

The counterfeit note serial number related condition may be configured by a combination of a number and a position for matching against the serial numbers stored in the storage section.

Another aspect of the present invention provides a cash processing terminal configuring a cash processing terminal cluster in a local network, the cash processing terminal including: a serial number acquisition section that acquires a serial number satisfying a counterfeit note serial number related condition from an information processing device provided between the cash processing terminal and an external network outside the local network; and a movement controller that controls such that a banknote printed with the serial number acquired by the serial number acquisition section is moved to a specific position.

The specific position may be either a banknote reject box or a designated banknote holding box.

Another aspect of the present invention provides an information processing system including cash processing terminals configuring a cash processing terminal cluster in a local network, and an information processing device provided between the cash processing terminals and an external network outside the local network, wherein: each of the cash processing terminals includes an information notification section that notifies serial numbers obtained by reading banknotes; and the information processing device includes an information acquisition section that in the local network acquires the serial numbers notified by the cash processing terminals, a storage controller that stores the serial numbers in a storage section; a condition acquisition section that acquires a counterfeit note serial number related condition; and a serial number notification section that acquires a serial number satisfying the condition from the storage section, and notifies the serial number to any of the cash processing terminals configuring the cash processing terminal cluster, or to a cash processing terminal in a local network that is different from the local network.

The serial number notification section may notify the serial number to a cash processing terminal selected from out of any of the cash processing terminals configuring the cash processing terminal cluster or a cash processing terminal in a local network that is different from the local network.

The counterfeit note serial number related condition may be configured by a combination of a number and a position for matching against the serial numbers stored in the storage section.

Advantageous Effects of Invention

The present invention explained above enables search and analysis of serial numbers read by cash processing terminals to be easily performed, and enables the workload when registering a counterfeit note serial number in the cash processing terminals to be reduced.

BEST MODE FOR CARRYING OUT THE INVENTION

Detailed explanation follows regarding a suitable exemplary embodiment of the present invention, with reference to the attached drawings. Note that in the present specification and in the drawings, configuration elements with substantially the same functional configuration are appended with the same reference numerals, and redundant explanation thereof is omitted.

Moreover, in the present specification and in the drawings, plural configuration elements with substantially the same functional configuration are sometimes distinguished by appending different letters of the alphabet after the same reference numeral. However, the same reference numeral is appended in cases in which there is no particular need to distinguish between each of plural configuration elements with substantially the same functional configuration.

Explanation of General Technology

Figure 1:
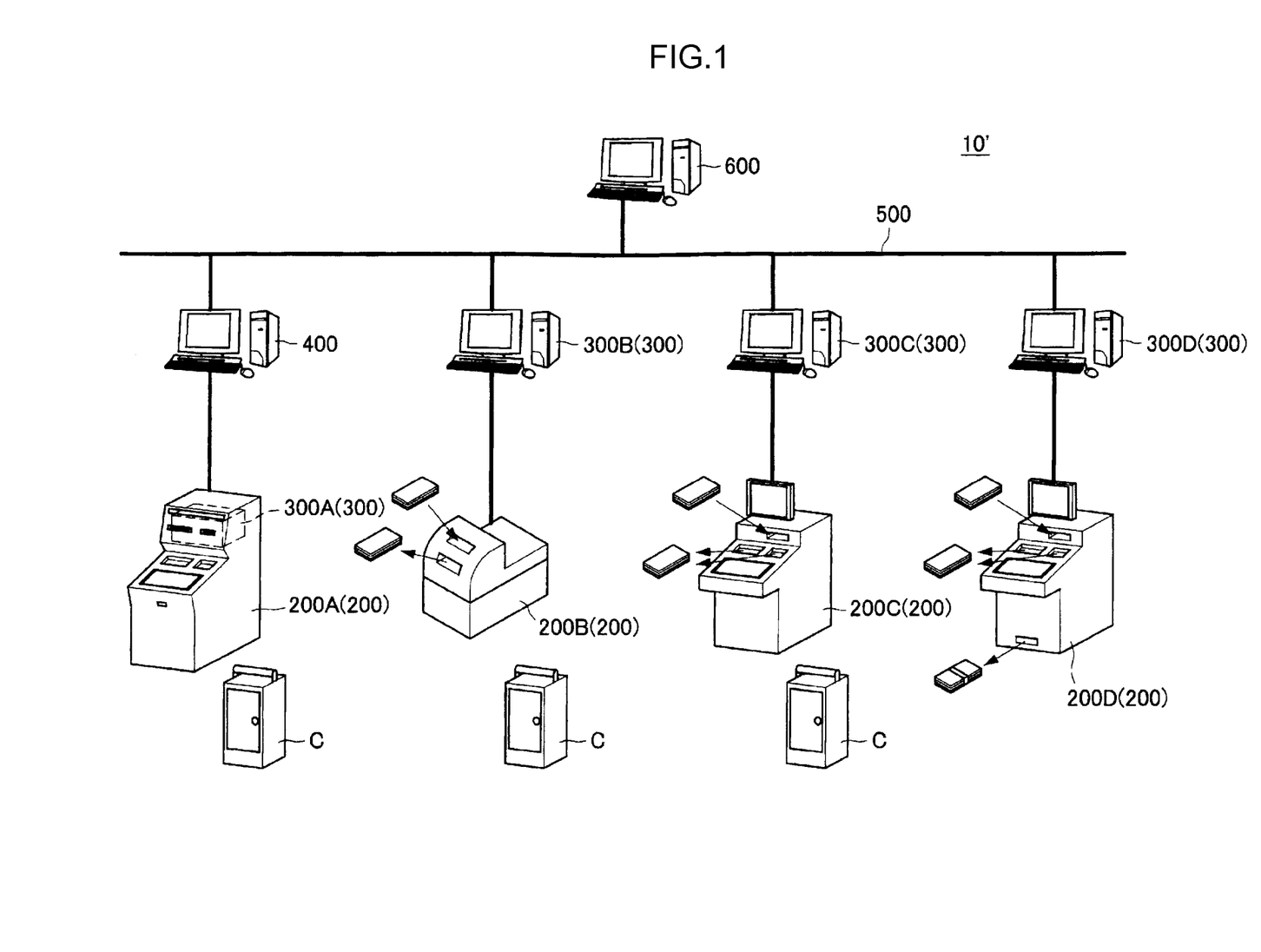
FIG. 1 illustrates a configuration of a general information processing system.

Explanation first follows regarding a configuration of a general information processing system 10'. FIG. 1 illustrates the configuration of the general information processing system 10'. As illustrated in FIG. 1, the general information processing system 10' is provided with cash processing terminals 200 that handle banknotes, high-level terminals 300 that correspond to higher level terminals than the cash processing terminals 200, an ATM monitoring device 400, and a financial administration system 600.

As described above, the cash processing terminals 200 and the high-level terminals 300 are in a local network. Namely, the cash processing terminals 200 and the high-level terminals 300 are connected to the local network. The local network is configured by a Local Area Network (LAN), for example. A core network 500 is an external network outside the local network, and is configured by a Wide Area Network (WAN), for example. The financial administration system 600 is connected to the core network 500.

The cash processing terminals 200 are installed in a financial institution such as a bank. Examples of the cash processing terminals 200 include an ATM 200A, a teller cash recycler 200B, a balance check cash recycler 200C, and a banknote sorting machine 200D. Examples of the high-level terminals 300 include an ATM controller 300A, a teller terminal 300B, a balance check terminal 300C, and a banknote sorting machine terminal 300D.

The ATM 200A is a terminal for customers to withdraw or deposit banknotes, and operates mounted with a cassette C for holding banknotes. The ATM controller 300A is inside the ATM 200A, and is connected to the ATM monitoring device 400. Although a single ATM 200A is connected to the ATM monitoring device 400 in the example illustrated in FIG. 1, plural ATMs 200A may be connected thereto. The ATM 200A is, for example, installed in a branch of a financial institution. The ATM monitoring device 400 is generally connected to the financial administration system 600 through the core network 500.

The teller cash recycler 200B is a terminal that pays in banknotes received from a customer, or pays out banknotes at the customer's request, based on operation of the teller terminal 300B by a bank worker. The teller cash recycler 200B is installed at a service counter of the financial institution, for example. Similarly to the ATM 200A, the teller cash recycler 200B operates mounted with a cassette C for holding banknotes. The teller terminal 300B is generally connected to the financial administration system 600 through the core network 500.

The balance check cash recycler 200C includes functionality to count money retrieved from the ATM 200A or the teller cash recycler 200B, and compute the cash balance based on operation of the balance check terminal 300C by a bank worker. The balance check cash recycler 200C is installed behind a service counter or in a back office of a bank, for example. Similarly to the ATM 200A, the balance check cash recycler 200C operates mounted with a cassette C for holding banknotes. The balance check terminal 300C is generally connected to the financial administration system 600 through the core network 500.

The banknote sorting machine 200D includes functionality to count and sort money retrieved from the ATM 200A or the teller cash recycler 200B, and applies a currency band to every specific number of notes (every 100 notes, for example), based on operation of the banknote sorting machine terminal 300D by a bank worker. Every specific number of notes, the banknote sorting machine 200D prints a band number on a currency band bundling banknotes, and outputs the bundle. The banknote sorting machine 200D can store the printed band numbers in date, hour, minute and second units. The banknote sorting machine 200D is installed behind the service counter, or in the back office of a bank, for example. The banknote sorting machine 200D does not include a cassette C that holds banknotes. The banknote sorting machine terminal 300D is generally connected to the financial administration system 600.

The respective cassettes C employed in the ATM 200A, the teller cash recycler 200B, and the balance check cash recycler 200C are generally interchangeable with each other. The cassettes C each have their own unique ID (hereafter also referred to as "cassette ID"), and the cassette ID is stored in internal memory of the cassette C. When mounted on the cash processing terminal 200, the cassette ID is read by the cash processing terminals 200.

The cash processing terminals 200 have a unique ID (hereafter also referred to as "device ID"), and the device ID is stored in internal memory of the cash processing terminals 200. As described above, banknotes are printed with serial numbers, and the cash processing terminals 200 include a function of reading the serial numbers printed on the banknotes. The serial numbers read by the ATM 200A may be accumulated by the ATM controller 300A. Similarly, the serial numbers read by the teller cash recycler 200B may be accumulated by the teller terminal 300B, the serial numbers read by the balance check cash recycler 200C may be accumulated by the balance check terminal 300C, and the serial numbers read by the banknote sorting machine 200D may be accumulated by the banknote sorting machine terminal 300D.

However, in the information processing system 10', the serial numbers read by the cash processing terminals 200 are only accumulated in the cash processing terminals 200, or the high-level terminals thereof (the ATM controller 300A, the teller terminal 300B, the balance check terminal 300C, the banknote sorting machine terminal 300D, or the like in the above-described example). Consequently, the serial numbers read by the cash processing terminals 200 are not centrally managed, and search and analysis of the serial numbers cannot be easily performed.

Suppose central management of the serial numbers in the information processing system 10' were to be performed, the cash processing terminals 200 would need to transmit the serial numbers to the financial administration system 600 via the core network 500 outside the local network, with central management of the serial numbers performed by the financial administration system 600. However, the financial administration system 600 is a location where data is strictly controlled by the bank, and, due to considerations of security and communication volumes, the financial administration system 600 cannot be easily accessed for search and analysis of serial numbers.

The exemplary embodiment of the present invention therefore proposes technology in which search and analysis of serial numbers read by the cash processing terminals 200 can be easily performed.

Explanation of Exemplary Embodiment

Figure 2:
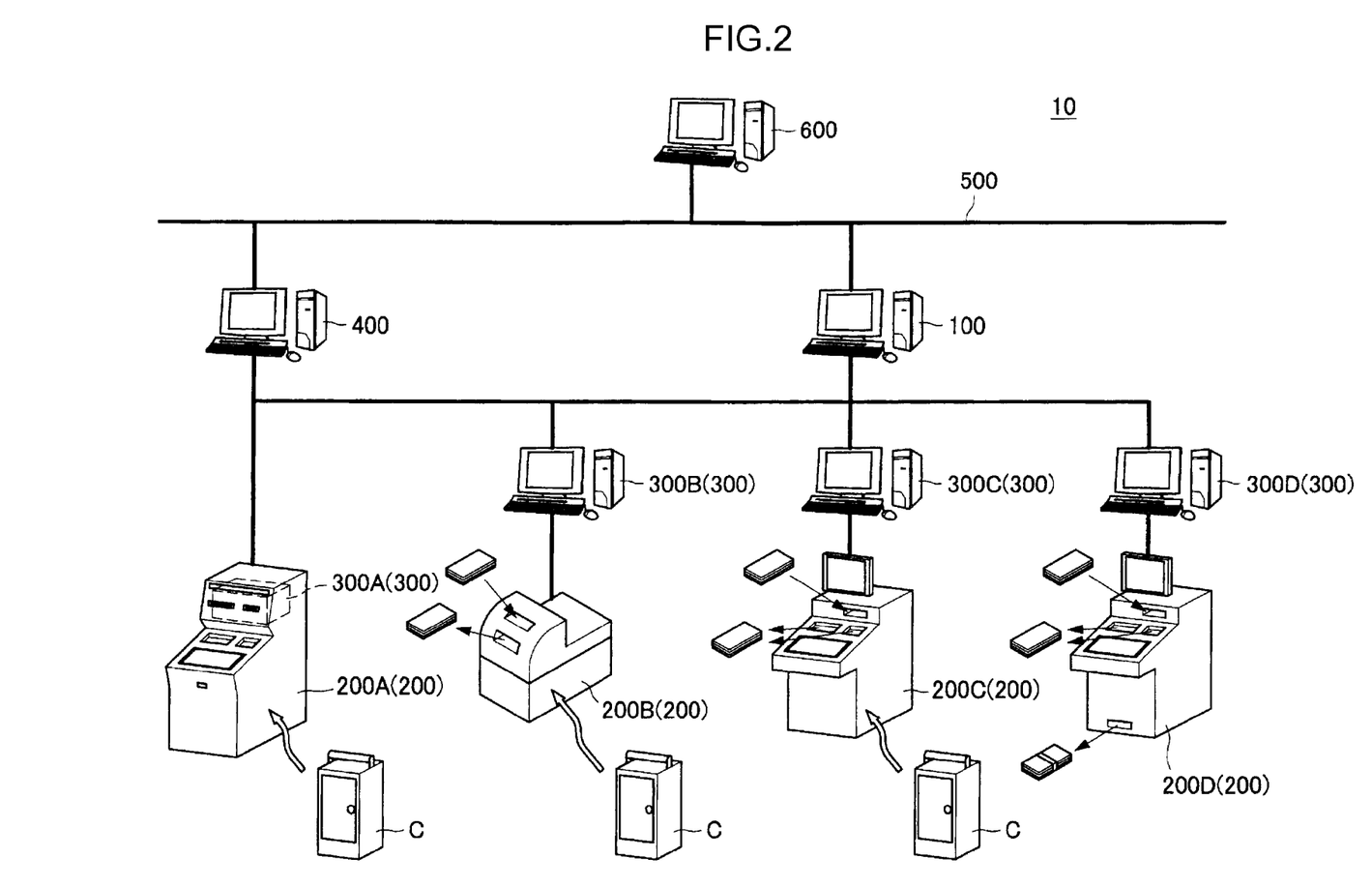
FIG. 2 illustrates a configuration of an information processing system according to an exemplary embodiment of the present invention.

Explanation follows regarding configuration of an information processing system 10 according to the exemplary embodiment of the present invention. FIG. 2 illustrates the configuration of the information processing system 10 according to the exemplary embodiment of the present invention. As illustrated in FIG. 2, the information processing system 10 principally differs from the general information processing system 10' in that an information processing device 100 is provided. In particular, the information processing device 100 is provided between the core network 500 and one or plural cash processing terminals 200 (hereafter referred to as a "cash processing terminal cluster") in the local network.

In the local network, the information processing device 100 acquires serial numbers obtained from banknotes read by the cash processing terminals 200 configuring the cash processing terminal cluster, and stores the serial numbers. In such a configuration, search and analysis of the serial numbers can be easily performed, since the serial numbers read by the cash processing terminals 200 are centrally managed.

Moreover, the serial numbers are managed by the information processing device 100 that differs from the financial administration system 600 where information is strictly controlled by the bank. Access restrictions due to considerations of security and communication volumes are therefore more relaxed than cases in which serial numbers are managed by the financial administration system 600. The information processing device 100 can therefore be easily accessed to perform search and analysis of serial numbers.

Note that the information processing device 100 may be provided as an independent device as illustrated in FIG. 2, or may be integrated with another device. For example, the information processing device 100 may be provided between the cash processing terminal cluster in the local network and the core network 500 in an integrated state with at least one of the balance check terminal 300C or the banknote sorting machine terminal 300D.

There is no particular limit to the number of cash processing terminals 200. Moreover, although the ATM 200A, the teller cash recycler 200B, the balance check cash recycler 200C, and the banknote sorting machine 200D are illustrated as examples of cash processing terminals 200 in the example illustrated in FIG. 2, there is no particular limitation to the type of the cash processing terminals 200. It is therefore sufficient that at least one out of the ATM 200A, the teller cash recycler 200B, the balance check cash recycler 200C, or the banknote sorting machine 200D is included in the cash processing terminal(s) 200 configuring the cash processing terminal cluster.

The configuration of the information processing system 10 according to the exemplary embodiment of the present invention has been explained above. Explanation follows regarding an example of functional configuration of the cash processing terminal 200 according to the exemplary embodiment of the present invention.

Explanation of Configuration

Figure 3:
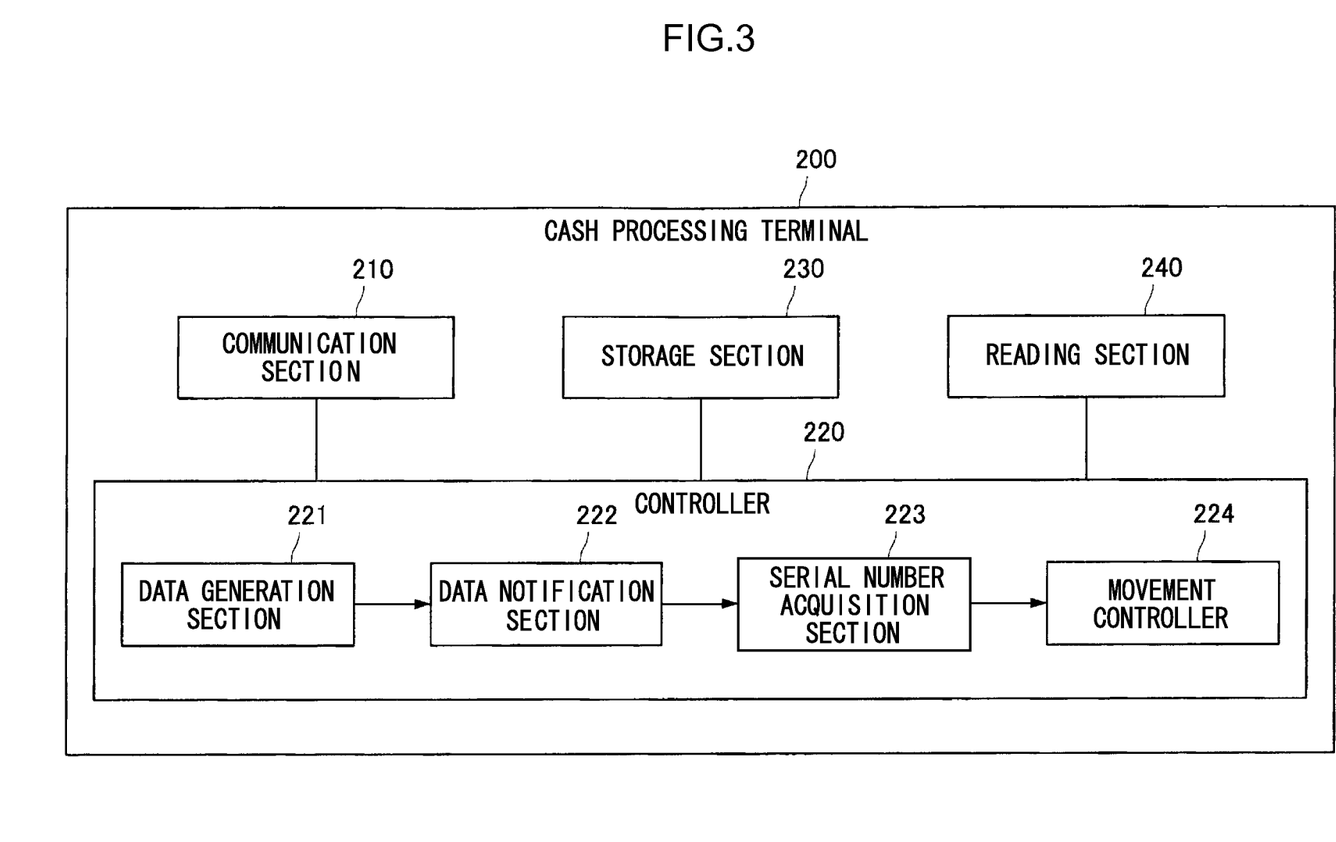
FIG. 3 illustrates an example of a functional configuration of a cash processing terminal according to an exemplary embodiment of the present invention.

FIG. 3 illustrates an example of the functional configuration of the cash processing terminal 200 according to the exemplary embodiment of the present invention. As illustrated in FIG. 3, the cash processing terminal 200 according to the exemplary embodiment of the present invention includes a communication section 210, a controller 220, a storage section 230, and a reading section 240.

The communication section 210 includes functionality to communicate with other devices under control of the controller 220. The controller 220 includes functionality to control overall operation of the cash processing terminal 200. The storage section 230 can store programs or data for operation of the controller 220. The storage section 230 can also temporarily store various data required in operational procedures of the controller 220. The reading section 240 includes functionality to read banknotes handled in a transaction.

Note that, although the communication section 210, the storage section 230, and the reading section 240 are inside the cash processing terminal 200 in the example illustrated in FIG. 3, the communication section 210, the storage section 230, and the reading section 240 may be externally provided to the cash processing terminal 200. The controller 220 is provided with an information generation section 221, an information notification section 222, a serial number acquisition section 223, and a movement controller 224. Detailed explanation follows regarding each of the functional sections provided to the controller 220.

The information generation section 221 includes functionality to generate data relating to banknotes handled in transactions by the cash processing terminal 200 (hereafter also referred to as "banknote data"). The banknote data referred to herein includes at least the serial numbers of the banknotes, and may also include transaction information, recognition results, and other information. For example, the information generation section 221 can recognize serial numbers from read data read by the reading section 240. The information generation section 221 may employ partial serial number data from the read data of banknotes in place of the serial number, in cases in which the serial number cannot be recognized correctly from the read data.

For example, the information generation section 221 can also recognize recognition results from the read data read by the reading section 240. The information generation section 221 can also acquire transaction information and other information from a specific location.

The information notification section 222 includes functionality to notify the information processing device 100 of banknote data generated by the information generation section 221. The information notification section 222 also includes functionality to notify the financial administration system 600 of banknote data generated by the information generation section 221. When notifying the financial administration system 600 of banknote data, the communication section 210 transmits banknote data to the financial administration system 600 through the core network 500.

The serial number acquisition section 223 acquires a serial number satisfying a condition relating to a counterfeit note from the information processing device 100. If, for example, the serial number acquisition section 223 is notified by the information processing device 100 of a serial number satisfying a condition relating to a counterfeit note, the serial number acquisition section 223 can acquire this serial number. It does not matter who discovered the counterfeit note. Detailed explanation regarding the counterfeit note serial number related condition is given later.

The movement controller 224 controls such that a banknote printed with the serial number acquired by the serial number acquisition section 223 is moved to a specific position. A banknote conveyance path moves the banknote printed with this serial number to the specific position under control of the movement controller 224. The specific position is not particularly limited, and may, for example, be either a banknote reject box (RJ box), or a designated banknote holding box.

Moving the counterfeit note to the specific position in this way enables the counterfeit note to be isolated. Transaction of the cash processing terminal 200 may also be stopped as the banknote is moved to the specific position. Note that a case is envisaged here in which the cash processing terminal 200 that notified the information processing device 100 of the serial number is the same as the cash processing terminal 200 acquiring the serial number from the information processing device 100, however they may be different from each other.

An example of the functional configuration of the cash processing terminal 200 according to the exemplary embodiment of the present invention has been explained above. Explanation follows regarding an example of functional configuration of the information processing device 100 according to the exemplary embodiment of the present invention.

Figure 4:
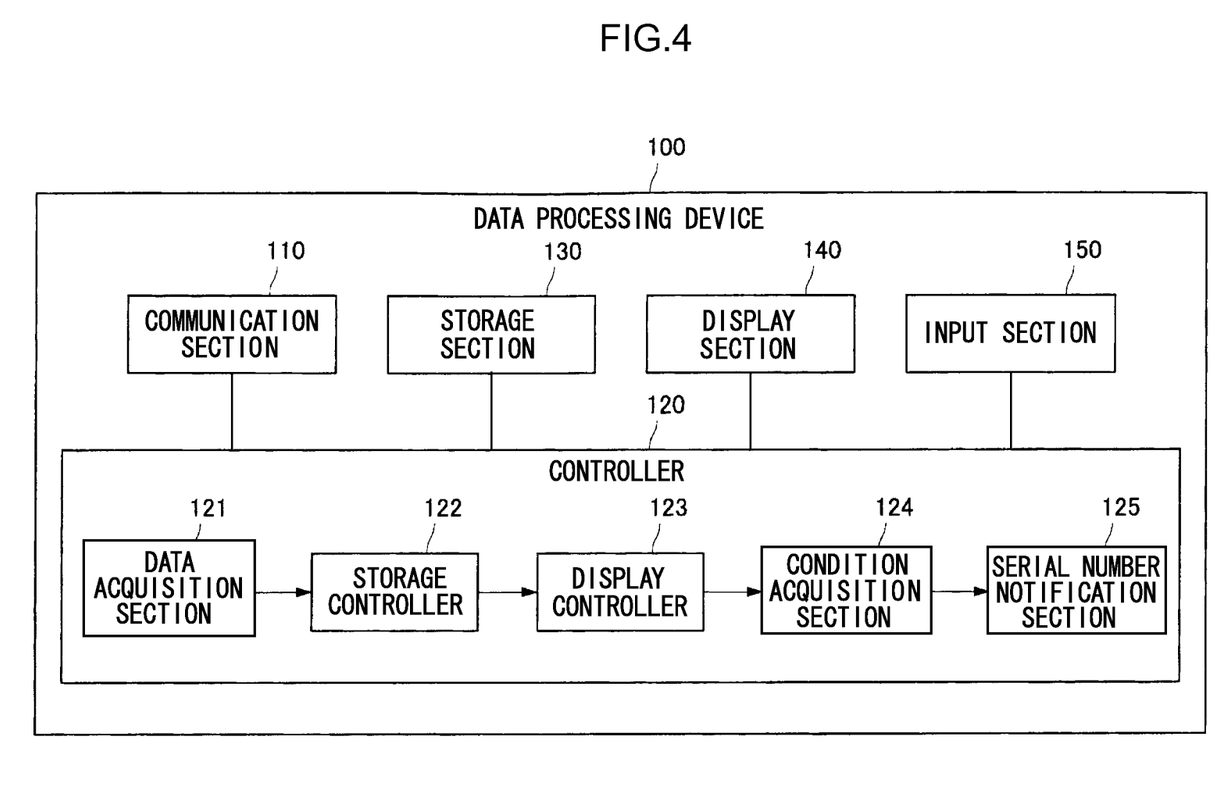
FIG. 4 illustrates an example of a functional configuration of an information processing device according to an exemplary embodiment of the present invention.

FIG. 4 illustrates an example of the functional configuration of the information processing device 100 according to the exemplary embodiment of the present invention. As illustrated in FIG. 4, the information processing device 100 according to the exemplary embodiment of the present invention includes a communication section 110, a controller 120, and a storage section 130. The information processing device 100 is further provided with a display section 140 and an input section 150.

The communication section 110 includes functionality to communicate with other devices under control of the controller 120. The controller 120 includes functionality to control overall operation of the information processing device 100. The storage section 130 can store programs or data for operation of the controller 120. The storage section 130 can also temporarily store various data required in the operational procedures of the controller 120. The display section 140 includes functionality to display information under control of the controller 120. The input section 150 includes functionality to receive information input by an operator.

Note that, although the communication section 110, the storage section 130, the display section 140 and the input section 150 are inside the information processing device 100 in the example illustrated in FIG. 4, the communication section 110, the storage section 130, the display section 140 and the input section 150 may be externally provided to the information processing device 100. The controller 120 is provided with an information acquisition section 121, which may also be referred to in the present specification as a data acquisition section 121, a storage controller 122, a display controller 123, a condition acquisition section 124, and a serial number notification section 125. Detailed explanation follows regarding each of the function sections provided to the controller 120.

The information acquisition section 121 includes functionality to acquire the banknote data, generated by the cash processing terminals 200 configuring the cash processing terminal cluster, in the local network (namely, the information acquisition section 121 includes functionality to acquire the banknote data through the local network). For example, the information acquisition section 121 acquires banknote data, notified by the information notification sections 222, in the local network.

The storage controller 122 stores the banknote data acquired by the information acquisition section 121 in the storage section 130. The banknote data includes at least serial numbers. In cases in which information other than serial numbers (for example, transaction information, recognition results, or other information) are included in the banknote data acquired by the information acquisition section 121, this information may be stored in the storage section 130 as history associated with the respective serial numbers.

By appending information other than the serial number to the history in this way, the information other than the serial number can also be utilized in search and analysis. The transaction information may have a common format for the plural cash processing terminals 200 configuring the cash processing terminal cluster. Utilizing a common format for the transaction information in the plural cash processing terminals 200 further facilitates use of the transaction information in search and analysis, compared to cases utilizing transaction information with formats that differ according to the cash processing terminal 200.

The display controller 123 controls so as to display various information. The display controller 123 can control so as to display a menu screen, a serial number registration screen, a registration destination setting screen or the like, as described below. The display section 140 performs display under the control of the display controller 123.

The condition acquisition section 124 acquires a counterfeit note serial number related condition. The counterfeit note serial number related condition may be configured by a combination of a number and a position for matching against serial numbers stored in the storage section 130. For example, in a case in which the number for matching is "1234", and the position for matching is "front match", serial numbers beginning with "1234" satisfy the counterfeit note serial number related condition. Note that the position for matching is not limited to "front match", and may be "full match", "rear match", "partial match", or the like.

The serial number notification section 125 acquires serial numbers satisfying the condition from the storage section 130, and notifies any of the cash processing terminals 200 configuring the cash processing terminal cluster, or notifies a cash processing terminal 200 in a local network (hereafter also referred to as the second local network) different from the above-described local network (hereafter also referred to as the first local network). The serial number notification section 125 may notify the serial numbers acquired from the storage section 130 to all of the cash processing terminals, or to some of the cash processing terminals, of the cash processing terminal cluster in the first local network, and the cash processing terminal cluster in the second local network.

A case is envisaged herein, for example, in which the second local network is at a different bank branch to the bank branch with the first local network, and is connected to the core network 500. The serial number notification section 125 may, for example, notify a serial number to selected cash processing terminal(s) of the cash processing terminal cluster in the first local network and the cash processing terminal cluster in the second local network. Selection of the cash processing terminals is performed by the serial number notification section 125, for example, based on operation of the input section 150 by an operator.

An example of the functional configuration of the information processing device 100 according to the exemplary embodiment of the present invention has been explained above. Explanation follows regarding an example of configuration of accumulated information accumulated in the information processing device 100 according to the exemplary embodiment of the present invention.

Figure 5:
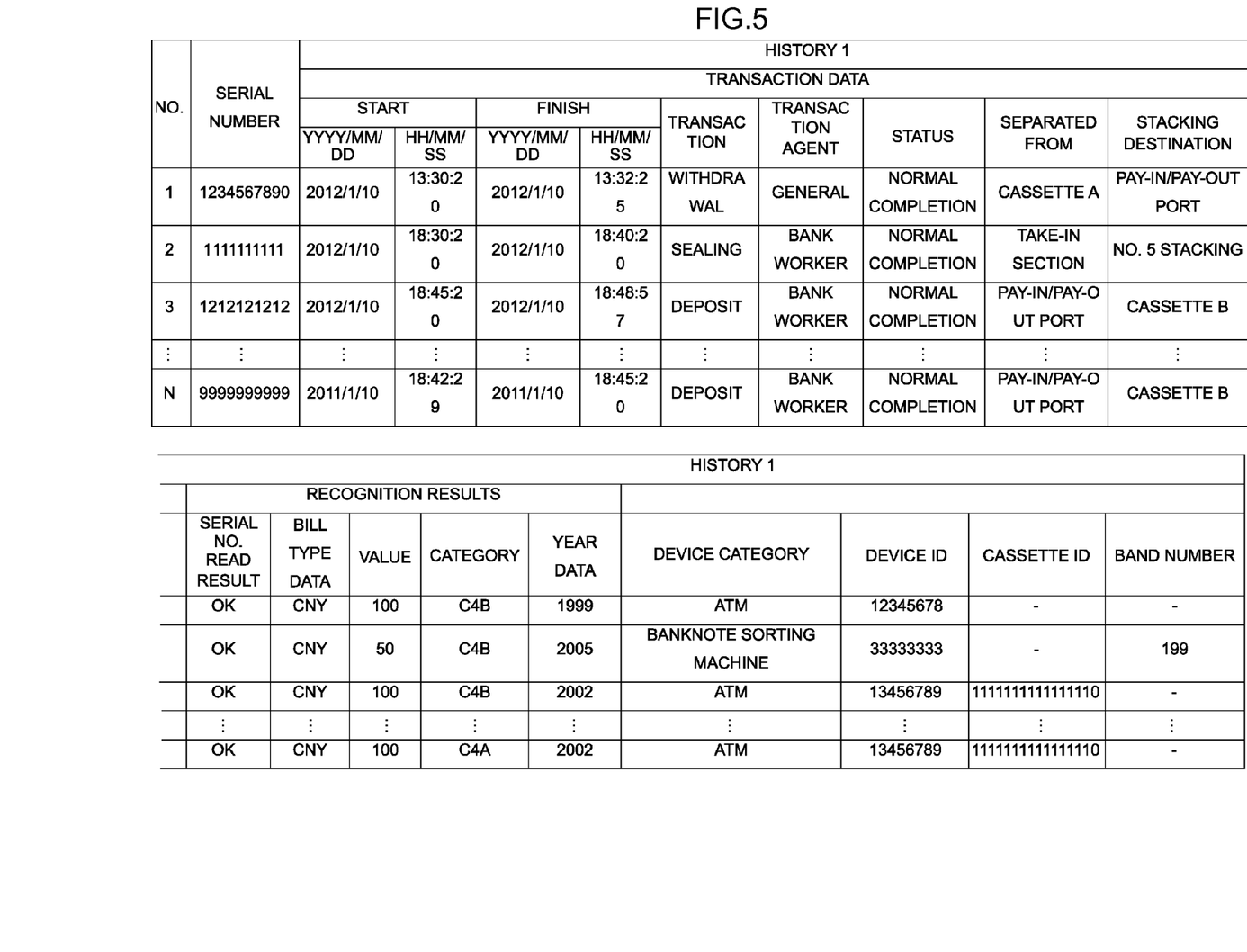
FIG. 5 illustrates an example of a configuration of accumulated data accumulated in an information processing device.
Figure 6:
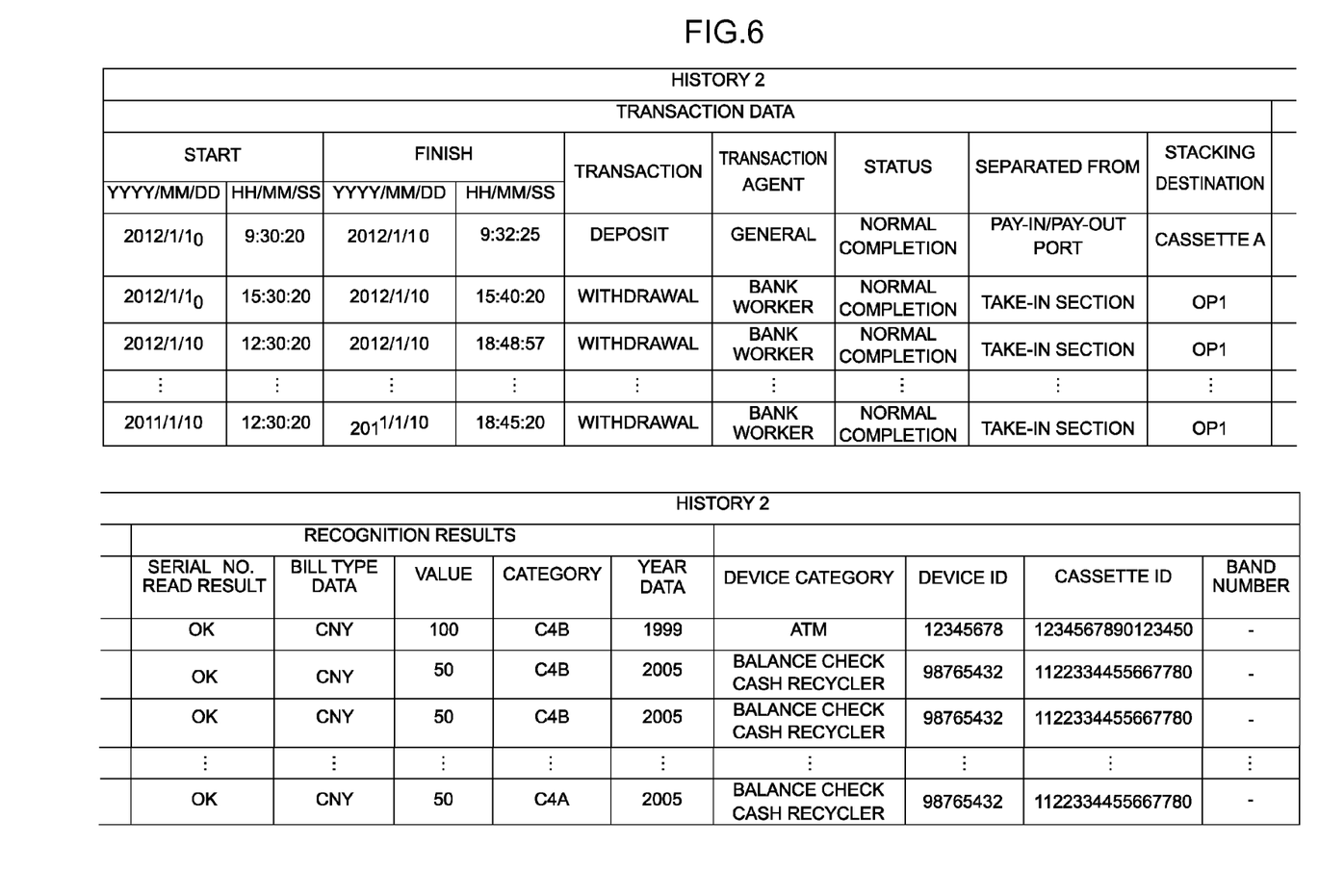
FIG. 6 illustrates an example of a configuration of accumulated data accumulated in an information processing device.
Figure 7:
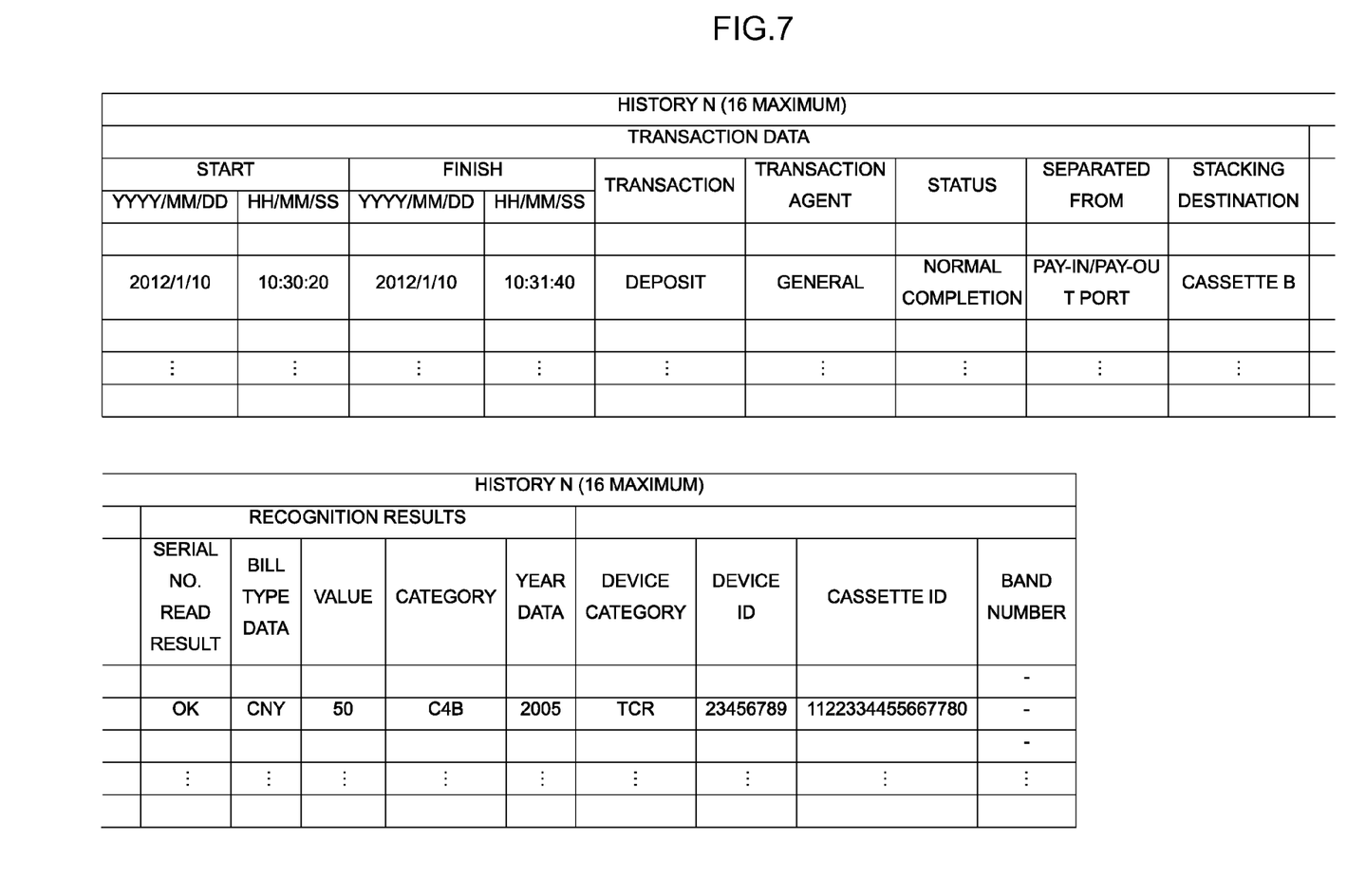
FIG. 7 illustrates an example of a configuration of accumulated data accumulated in an information processing device.

FIG. 5 to FIG. 7 illustrate an example of the configuration of accumulated data accumulated in the information processing device 100 according to the exemplary embodiment of the present invention. As illustrated in FIG. 5 to FIG. 7, the accumulated data is configured with histories 1 to n (for example, n≤16) associated with each serial number. Namely, when serial numbers and histories have been acquired from the cash processing terminals 200, the information processing device 100 stores the history associated with the corresponding serial number. Each history includes, for example, "transaction information", "recognition results", and "other information".

The "transaction information" includes "start", "finish", "transaction", "transaction agent", "status", "separated from", and "stacking destination". The "start" indicates the date and time a transaction was started by the cash processing terminal 200, and the "finish" indicates the date and time the transaction was finished by the cash processing terminal 200. The "transaction" information indicates the type of transaction performed by the cash processing terminal 200, examples of transactions including deposits, withdrawals, bundling, counting, and so on.

The "transaction agent" is information indicating the person performing the transaction. For example, the transaction agent is a customer when deposit or withdrawal transactions are performed by the ATM 200A or the teller cash recycler 200B, the transaction agent is a bank worker when a counting transaction is performed by the teller cash recycler 200B, and the transaction agent is a bank worker when a transaction is performed by the balance check cash recycler 200C or the banknote sorting machine 200D.

The "status" is information indicating whether or not a transaction completed correctly. Examples of the status include normal completion and completion error. The "stacking destination" is information indicating the banknote holding location inside the cash processing terminal 200. Examples of stacking destinations include a cassette, a pay-in/pay-out port, a temporary holding section, a stacking box, and an RJ box. In particular, the RJ box serves as the stacking destination for holding the banknote when an abnormal banknote is discovered.

The "recognition results" include "serial number read result", "bill type information", "value", "category" and "year information". The "serial number read result" indicates whether or not a serial number could be read correctly. Partial serial number data of read data of the banknote may be accumulated instead of the serial number if the serial number cannot be recognized correctly. The "bill type information" is information indicating the area (the country, for example) where the banknote was issued. Examples of bill type information include the American currency unit (=American dollar), Chinese currency unit (=Chinese yuan), and Japanese currency unit (=Japanese yen). The "value" is information indicating the value of the banknote.

The "Category" is information indicating the category of banknote, and is expressed, for example, by C1, C2, C3, C4a, C4b, and so on. Note that C1 is a category containing bills other than banknotes. C2 is a category containing bills that are suspected to be counterfeit bills, and C3 is a category containing bills that have a high likelihood of being counterfeit bills. C4a is a category containing bills that are normal bills, and C4b is a category containing bills that are damaged bills. The "year information" is information indicating the year the banknote was issued.

The "other information" includes "device category", "device ID", "cassette ID" and "band number". The "device category" is information indicating the category of the cash processing terminal 200 on which a transaction was performed. For example, the "device category" may be information indicating any one of an ATM, a teller cash recycler, a balance check cash recycler, or a banknote sorting machine. The "device ID" corresponds to ID for identifying the cash processing terminal 200 on which the transaction was performed. The "cassette ID" corresponds to ID for identifying a cassette C where the banknote is held. The "band number" corresponds to the band number printed on the banknote bundle bundled by the banknote sorting machine 200D.

An example of configuration of the accumulated data accumulated in the information processing device 100 according to the exemplary embodiment of the present invention has been explained above. Explanation follows regarding an operational flow during operation of the information processing system 10 according to the exemplary embodiment of the present invention.

Explanation of Operation

Figure 8:
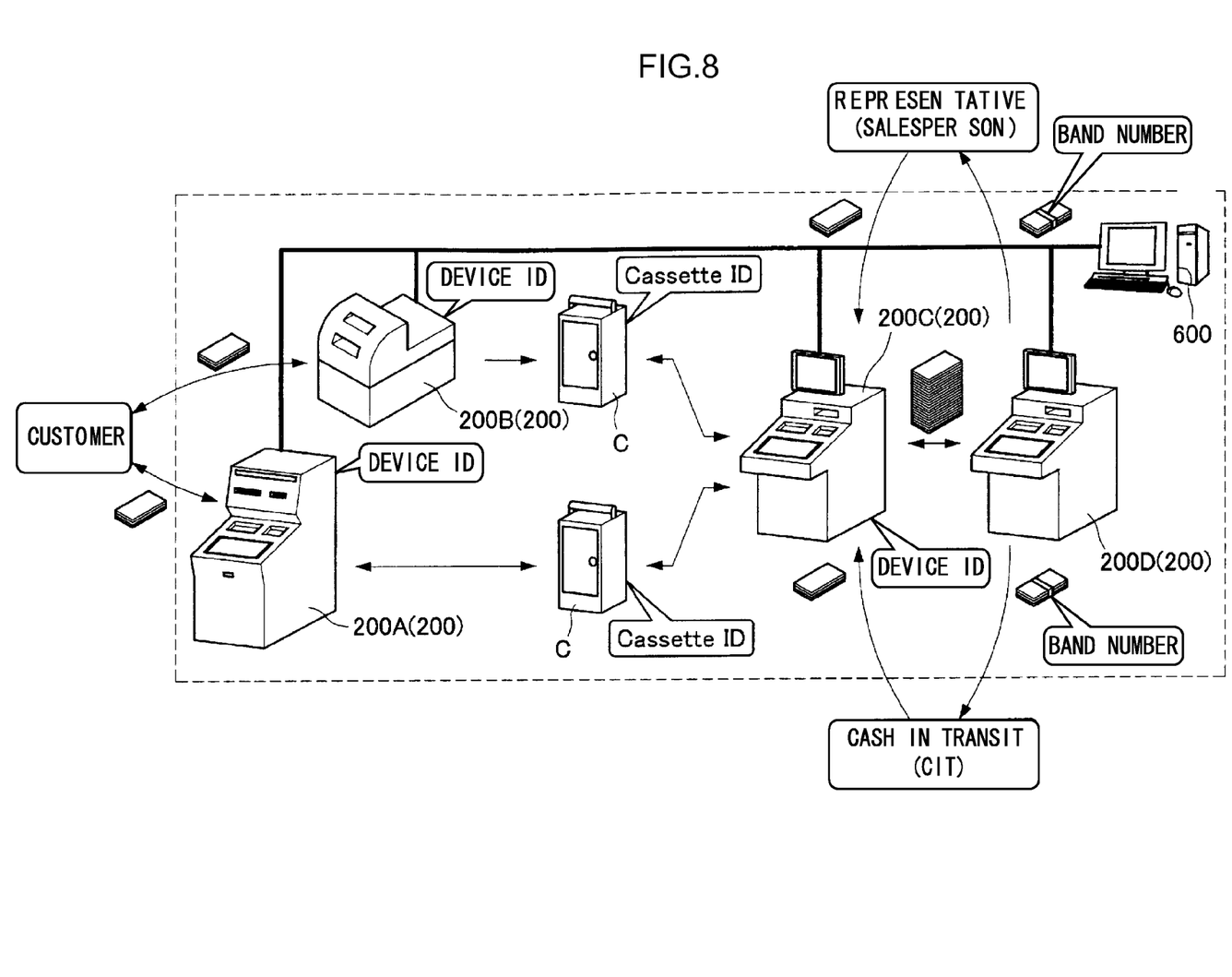
FIG. 8 illustrates an example of operation of an information processing system.

FIG. 8 illustrates an example of operation of the information processing system according to the exemplary embodiment of the invention. As illustrated in FIG. 8, firstly, customers deposit or withdraw banknotes using the ATM 200A or the teller cash recycler 200B. When cashing up at the end of operation or the like, a bank worker at the financial institution removes the cassette C from the ATM 200A or the teller cash recycler 200B, and mounts the removed cassette C in the balance check cash recycler 200C.

Next, the financial institution bank worker counts the banknotes using the balance check cash recycler 200C, and confirms the balance of the banknotes. The financial institution bank worker inserts the banknotes paid out by the balance check cash recycler 200C into the banknote sorting machine 200D.

The financial institution bank worker sorts the banknotes by denomination, and into either damaged bills or normal bills, using the banknote sorting machine 200D. Damaged bills correspond to damaged or dirty banknotes not for circulation. Normal bills correspond to undamaged banknotes that present no issue to being recirculated. Using the banknote sorting machine 200D, the financial institution bank worker sorts the banknotes, and, every specific number of notes (every 100 notes, for example), applies a currency band to form banknote bundles.

The banknote bundles applied with currency bands may be held in a safe on the premises, or may be transported to a cash center or another branch. Alternatively, a representative (or salesperson) may take the banknote bundles to a customer outside the branch for business purposes. Note that, depending on the operational policy of the financial institution, the banknotes are sometimes held in the safe on the premises, or transported to the cash center or the other branch while being held in the cassette C.

A representative or company (cash transport company=Cash In Transit: CIT) transporting cash to the financial institution inserts banknotes into the balance check cash recycler 200C to be counted, and confirms the balance of the banknotes brought. Alternatively, the representative or company transporting the cash to the financial institution holds banknotes, of which the denomination and number of notes have been confirmed, in the cassette C as replenishment cash for the ATM 200A or the teller cash recycler 200B. The financial institution bank worker mounts the cassette C in which the banknotes are held to the ATM 200A or the teller cash recycler 200B, and customer transactions are started.

In the work flow illustrated above, whenever banknotes are counted by the respective cash processing terminals 200, the serial numbers of the banknotes are read by the cash processing terminal 200, and notified as banknote data to the information processing device 100. As illustrated in FIG. 5 to FIG. 7, the notified banknote data is compiled in a format in which the serial number and history are associated with each other, and accumulated in the storage section 130 of the information processing device 100. The information processing device 100 is thereby able to manage the history of the banknotes (how the banknotes were handled on the premises, for example).

An operational flow of the information processing system 10 according to the exemplary embodiment of the present invention has been explained above. Explanation follows regarding an example of a flow of operation of the information processing system 10 according to the exemplary embodiment of the present invention.

Figure 9:
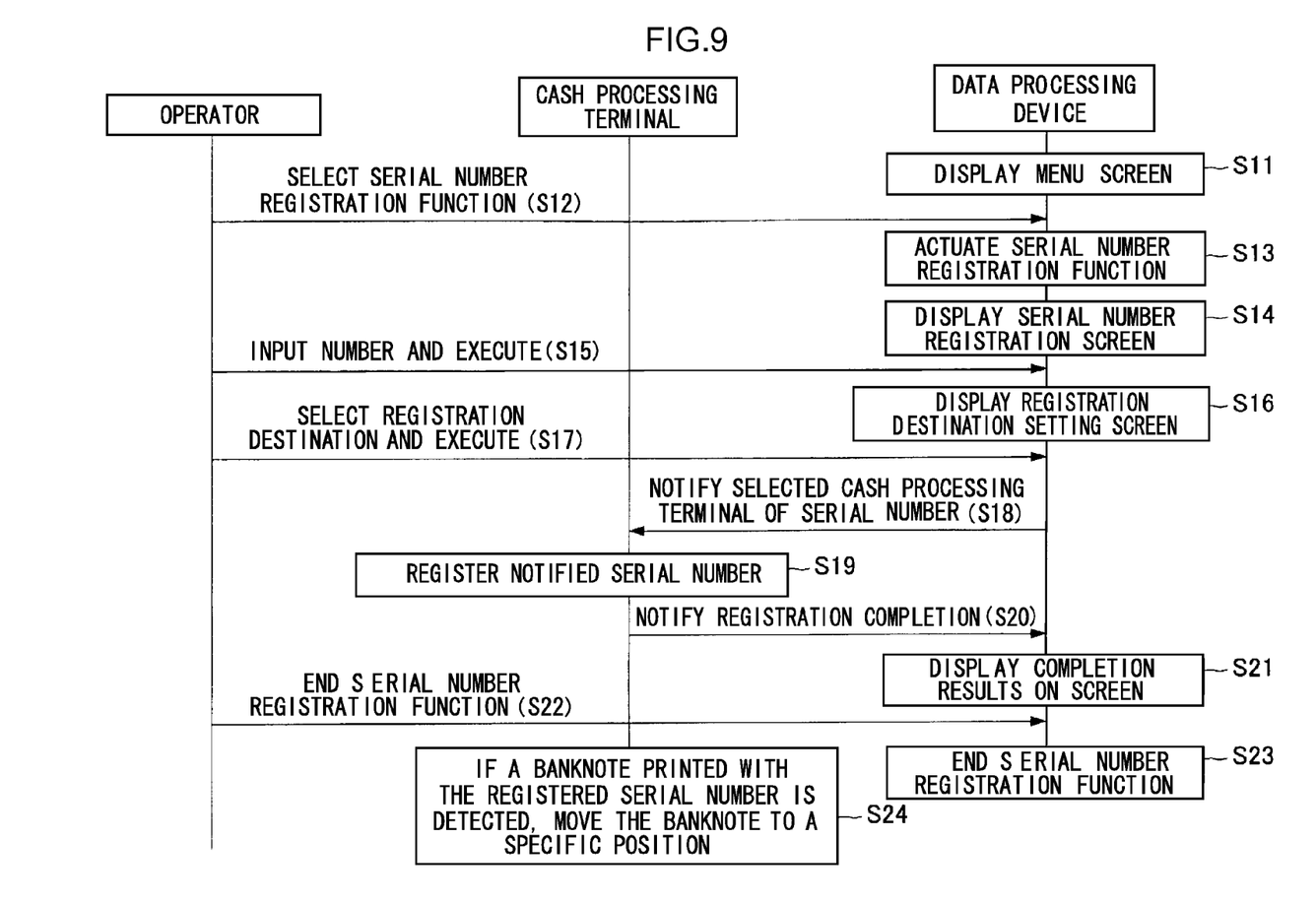
FIG. 9 illustrates an example of a flow of operation in an information processing system.
Figure 10:
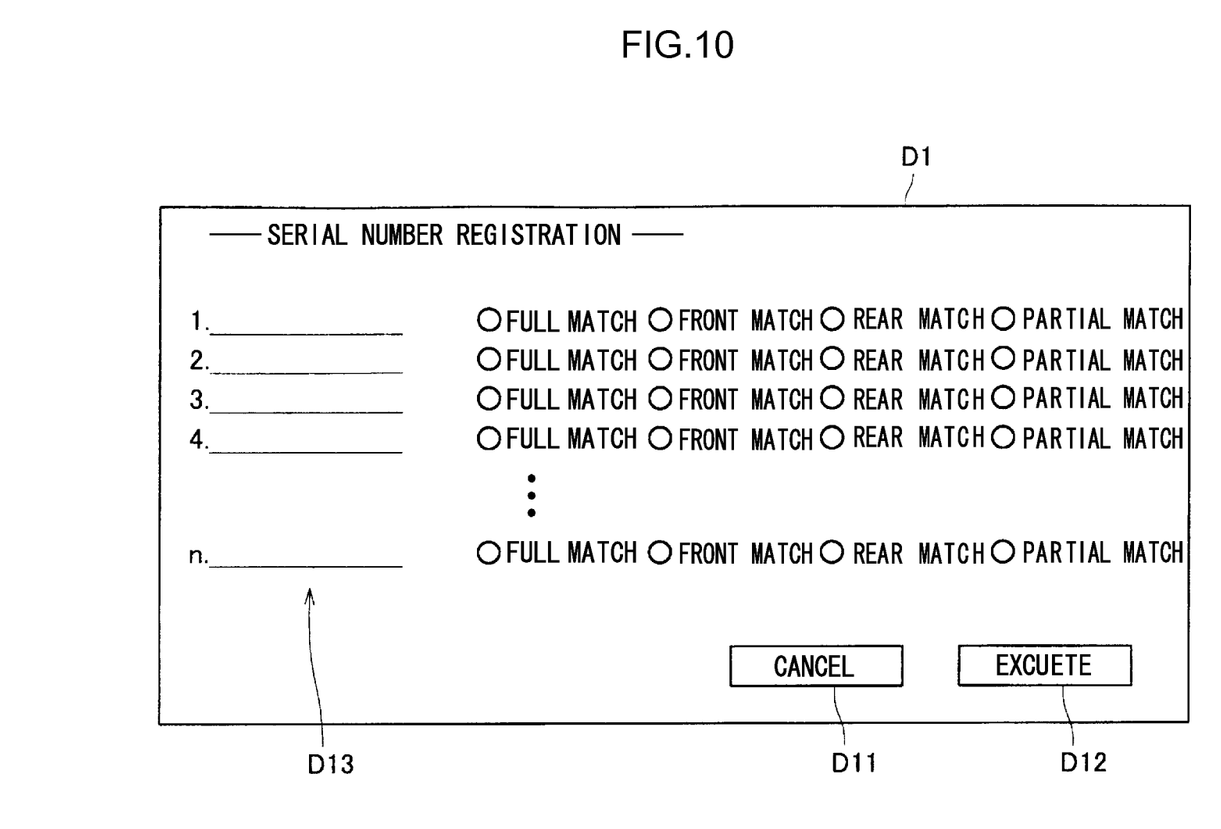
FIG. 10 illustrates an example of a serial number registration screen displayed by a cash processing terminal.
Figure 11:
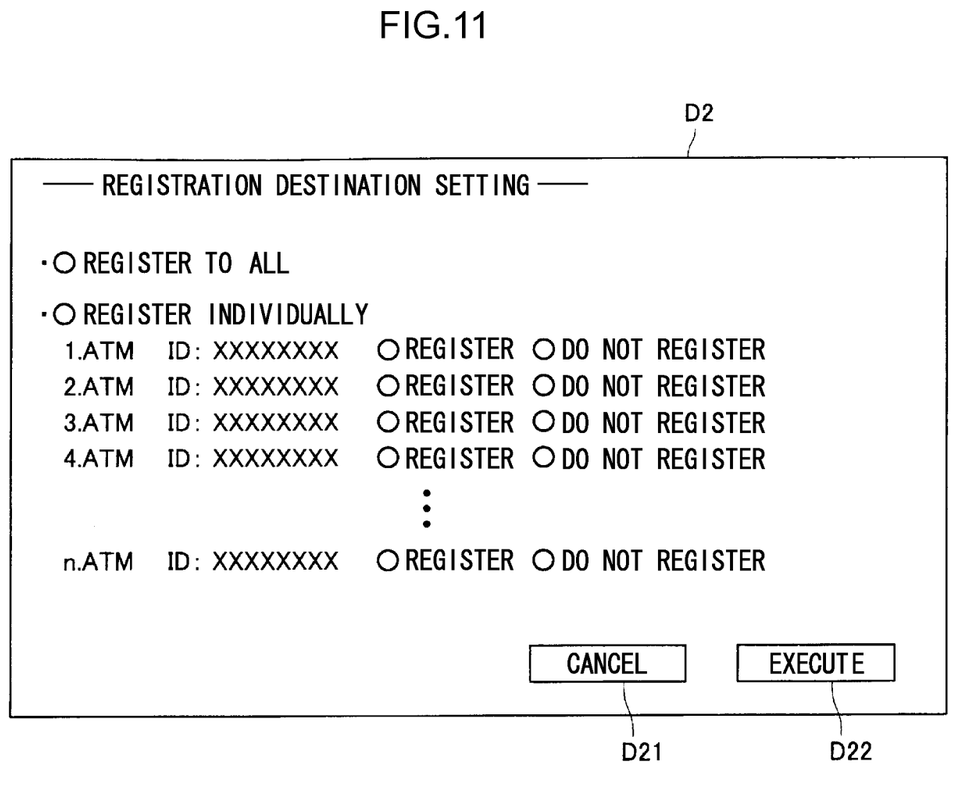
FIG. 11 illustrates an example of a registration destination setting screen displayed by a cash processing terminal.

FIG. 9 illustrates an example of a flow of operation of the information processing system 10 according to the exemplary embodiment of the present invention. FIG. 10 illustrates an example of a serial number registration screen displayed by the cash processing terminal 200. FIG. 11 illustrates an example of a registration destination setting screen displayed by the cash processing terminal 200. Note that example of the flow of operation illustrated in FIG. 9 is merely an example of the flow of operation of the information processing system 10, and it goes without saying that operation of the information processing system 10 is not limited to the example illustrated in FIG. 9.

As illustrated in FIG. 9, first, the information processing device 100 displays a menu screen (step S11). A case is envisaged here in which a button for selecting a serial number registration function is included on the menu screen. When an operator has selected the serial number registration function (step S12), the information processing device 100 starts up the serial number registration function (step S13). As illustrated in FIG. 10, the information processing device 100 can display a serial number registration screen D1 when this occurs (step S14).

An example is illustrated here in which the serial number registration screen D1 includes a cancel button D11 for cancelling serial number registration, an execute button D12 for executing the serial number registration, and a number input field D13 for inputting the number for matching. In the example illustrated in FIG. 10, selection fields are also provided for selecting the position for matching corresponding numbers (for example, "full match", "front match", "rear match", "partial match", or the like). In the example described above, the number and position for matching corresponds to the counterfeit note serial number related condition.

When the operator inputs a number for matching into the number input field D13, inputs the position for matching this number, and selects the execute button D12 (step S15), as illustrated in FIG. 11, the information processing device 100 can display a registration destination setting screen D2 (step S16). An example is illustrated here in which the registration destination setting screen D2 includes a cancel button D21 for cancelling setting of the registration destination, and an execute button D22 for executing the registration destination setting.

The example illustrated in FIG. 11 is further provided with a selection field for selecting the serial number registration format ("register to all", "register individually"), and a selection field for selecting whether or not to register the serial number with each respective cash processing terminal (for example, "register", "do not register") when "register individually" has been selected. Note that, of the cash processing terminal cluster in the first local network and the cash processing terminal cluster in the second local network, all of the cash processing terminals may be selectable, or some of the cash processing terminals may be selectable.

When the operator has selected a cash processing terminal 200 as the registration destination, and selected the execute button D12 (step S17), the information processing device 100 notifies the selected cash processing terminal 200 of any serial number(s) that match the input number and position (step S18). The cash processing terminal 200 notified of the serial numbers registers the notified serial numbers (step S19), and notifies the information processing device 100 of registration completion (step S20). Upon receiving the registration completion notification, the information processing device 100 displays completion results on the screen (step S21).

When the operator has checked the completion results and selected to end the serial number registration function (step S22), the information processing device 100 ends the serial number registration function (step S23). If the cash processing terminal 200 that has registered the serial number detects a banknote printed with the registered serial number, the banknote is moved to a specific position (step S24). Movement of counterfeit notes by the cash processing terminal 200 to the specific position as described above enables counterfeit notes to be isolated.

Explanation of Advantageous Effects

As explained above, in the exemplary embodiment of the present invention, the information processing system 10 principally differs from the general information processing system 10' in that the information processing device 100 is provided. In particular, the information processing device 100 is provided between the cash processing terminal cluster in the local network and the core network 500.

In the local network, the information processing device 100 acquires serial numbers obtained from banknotes read by the cash processing terminals 200 configuring the cash processing terminal cluster, and stores the serial numbers. In such a configuration, the serial numbers read by the cash processing terminals 200 are centrally managed, enabling search and analysis of the serial numbers to be easily performed.

Since the cash processing terminals are automatically notified of serial numbers satisfying a counterfeit note serial number related condition, an operator (such as a bank worker or maintenance staff) is not required to manually input registration of counterfeit note serial numbers into each cash processing terminal, thereby enabling the working time of the operator to be reduced. This also enables error when inputting counterfeit note serial numbers to be reduced. If the cash processing terminal notified of a serial number detects a banknote printed with that serial number, the cash processing terminal can control such that the banknote is moved to a specific position.

Explanation of Modified Examples

Detailed explanation is given above regarding a suitable exemplary embodiment of the present invention with reference to the drawings, however the present invention is not limited to the above example. It would be clear to a practitioner familiar with the technical field of the present invention that various modifications and adjustments may be implemented within the scope of the technical concept recited in the claims, and any such modifications and adjustments should obviously be understood to be included within the technical scope of the present invention.

Each of the blocks configuring the controller 120 may, for example, be configured by a Central Processing Unit (CPU), Random Access Memory (RAM), and the like, and such functionality may be realized by the CPU expanding a program stored in the storage section 130 into the RAM, and executing the program. Alternatively, each of the blocks configuring the controller 120 may be configured by dedicated hardware, or may be configured by a combination of plural hardware.

Each of the blocks configuring the controller 220 may, for example, be configured by a CPU, RAM, and the like, and functions of the blocks may be realized by the CPU expanding a program stored in the storage section 230 into the RAM and executing the program. Alternatively, each of the blocks configuring the controller 220 may be configured by dedicated hardware, or may be configured by a combination of plural hardware.

In the present specification, the steps depicted in the flow charts obviously include processing performed in the time sequence matching the depicted sequence, and also include processing performed in parallel, or individually, with processing not necessarily being performed in time sequence. It goes without saying that the sequence of steps processed in time sequence may also be varied as appropriate.

The invention claimed is:

1. An information processing device provided between a cash processing terminal cluster in a local network and an external network outside the local network, the information processing device comprising:
    an information acquisition section that, in the local network, acquires serial numbers obtained from banknotes read by cash processing terminals configuring the cash processing terminal cluster;
    a storage controller that stores the serial numbers in a storage section;
    a condition acquisition section that acquires a counterfeit note serial number related condition; and
    a serial number notification section that acquires a serial number satisfying the condition from the storage section, and sends a notification of the serial number to any of the cash processing terminals that make up the cash processing terminal cluster, or to a cash processing terminal in a local network different from the local network.

2. The information processing device of claim 1, wherein:
    the serial number notification section sends the notification of the serial number to a cash processing terminal selected from out of any of the cash processing terminals that make up the cash processing terminal cluster or a cash processing terminal in a second local network that is different from the local network.

3. The information processing device of claim 1, wherein:
    the counterfeit note serial number related condition is made up of a combination of a number and a position for matching against the serial numbers stored in the storage section.

4. The information processing device of claim 1, wherein the counterfeit note serial number related condition comprises a set of numbers less than a full serial number.

5. The information processing device of claim 4, wherein the counterfeit note serial number related condition further comprises a position of the set of numbers within the full serial number.

6. An information processing system, comprising:
    an information processing device; and
    a cash processing terminal that is part of a cash processing terminal cluster in a local network, the cash processing terminal comprising:
        a serial number acquisition section that acquires a serial number satisfying a counterfeit note serial number related condition from the information processing device provided between the cash processing terminal and an external network outside the local network; and
        a movement controller that controls movement of a banknote printed with the serial number, such that the banknote printed with the serial number acquired by the serial number acquisition section is moved to a specific position,
    wherein the information processing device includes an information acquisition section configured to acquire serial numbers from cash processing terminal corresponding to notes processed by the cash terminal, a condition acquisition section that acquires the counterfeit note serial number related condition, and a serial number notification section that acquires the serial number satisfying the condition from a storage section and sends a notification of the serial number to one or more of the cash processing terminals in the cash processing terminal cluster including the cash processing terminal, or to a second cash processing terminal in a second local network different from the local network.

7. The cash processing terminal of claim 6, wherein the specific position is either a banknote reject box or a designated banknote holding box.

8. An information processing system comprising cash processing terminals that make up a cash processing terminal cluster in a local network, and an information processing device provided between the cash processing terminals and an external network outside the local network, wherein:

each of the cash processing terminals includes an information notification section that notifies serial numbers obtained by reading banknotes; and the information processing device comprises:

an information acquisition section that, in the local network, acquires the serial numbers notified by the cash processing terminals, a storage controller that stores the serial numbers in a storage section, a condition acquisition section that acquires a counterfeit note serial number related condition, and a serial number notification section that acquires a serial number satisfying the condition from the storage section, and sends a notice of the serial number to any of the cash processing terminals that make up the cash processing terminal cluster, or to a cash processing terminal in a local network that is different from the local network.

9. The information processing system of claim 8, wherein:

the serial number notification section sends the notice of the serial number to a cash processing terminal selected from out of any of the cash processing terminals that make up the cash processing terminal cluster or a cash processing terminal in a second local network that is different from the local network.

10. The information processing system of claim 8, wherein:

the counterfeit note serial number related condition is made up of a combination of a number and a position for matching against the serial numbers stored in the storage section.

* * * * *